United States Patent [19]

Hirschhorn et al.

[11] 3,914,656

[45] Oct. 21, 1975

[54] AUTOMATIC GROUNDING SYSTEM

[75] Inventors: Ralph Isaac Hirschhorn, Spring Valley, N.Y.; Gurcharan Singh Bhusri, Wayne, N.J.

[73] Assignee: North American Philips Corporation, New York, N.Y.

[22] Filed: Apr. 26, 1974

[21] Appl. No.: 464,630

[52] U.S. Cl. .................................. 317/9 R; 340/292

[51] Int. Cl.[2] ........................................... H02H 3/20

[58] Field of Search..... 340/292, 147 SC; 317/33 C, 317/151, 9 R

[56] References Cited

UNITED STATES PATENTS 3,518,378 6/1970 McLeod et al. ................ 340/292 X

OTHER PUBLICATIONS

"Silicon Zener Diode and Rectifier Handbook," 9/64, p. 79.

*Primary Examiner*—James D. Trammell

*Attorney, Agent, or Firm*—Frank R. Trifari; Henry I. Steckler

[57] ABSTRACT

A system for grounding alarm boxes on a series loop if a break occurs in the loop has a diode bridge and a Zener diode at each box. If a break occurs the central station power supply supplies a high voltage between the loop terminals and ground thus triggering the Zener diode which is connected to ground. The boxes can then signal through the ground path.

18 Claims, 3 Drawing Figures

AUTOMATIC GROUNDING SYSTEM

The present invention relates to alarm boxes, and more particularly, to circuits and methods for grounding the boxes if a break occurs in a transmission line.

Alarm boxes are typically connected to each other and to a central station by means of a series loop transmission line. The alarm signal indicates that police, fire, or an ambulance is needed. The series loop can be an underground cable buried beneath the streets of the city or it can be an overhead cable. As is well known, streets are constantly being dug up to make repairs or to expand various utility lines and pipes that are buried below them. A problem that frequently arises is that other utilities, such as the alarm system, have their transmission cables necessarily or inadvertently cut, or the overhead lines can break in storms. It is possible to have relays which are in the series loop within the alarm boxes to detect the cut by detecting a loss of a DC current through it. They then automatically ground the activated box to complete the loop. Being electromechanical devices, relays have trouble with corrosion of contacts, etc., and are expensive. In addition, since there are numerous boxes series connected on the loop, the sum total of the relay inductances is large, which tends to block transmission of AC signals, such as voice or tone signals. One possible way of overcoming this problem, is to have series RC circuits respectively connected in parallel with each of the relay coils. They will tend to bypass the relay coil inductance for AC signals. However, the use of additional components further drives up the expense of using relays.

It is therefore an object of the present invention to provide a reliable automatic grounding circuit and method.

It is a further object to provide one that is inexpensive.

In brief, these and other objects, are achieved by having in the central station a means for applying a high voltage between both sides of the transmission loop and ground upon the occurrence of a break in the loop. At each box a diode switches on upon the occurrence of the high voltage and connects the box to ground to complete the transmission path. A diode bridge ensures that no matter which part of the loop is broken, the grounding takes place.

These and other objects, features, and advantages, will become apparent from the following description when taken in conjunction with the drawings in which.

Figure 1:
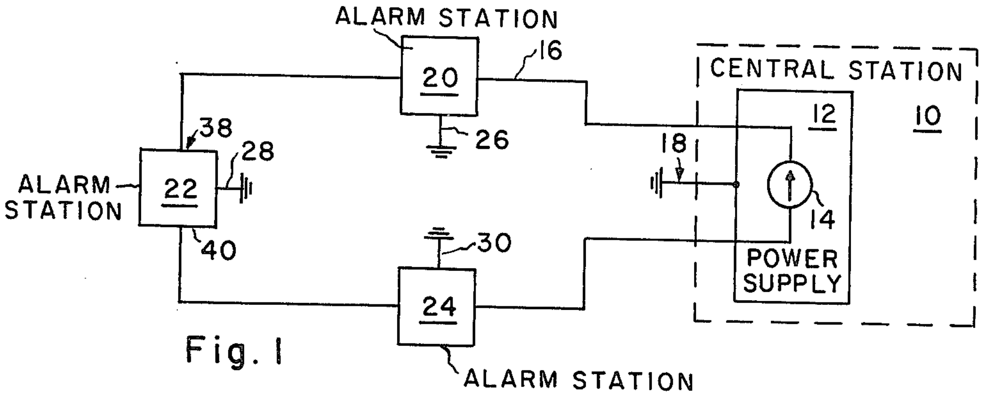
FIG. 1 is a schematic drawing of the normally operating circuit.

In FIG. 1 there is shown a central station 10 having a DC power supply 12 symbolized by a constant current source 14. For ease of understanding, a loop 16 is shown directly connected to supply 12, however, it is to be understood that there are actually interface circuits that route voice and tone signals, to their various destinations within the central station 10. This is shown in greater detail in application Ser. No. 340,769, filed Mar. 13, 1973. Central station 10 is also grounded by line 18. Three alarm station boxes 20, 22, 24, are shown series coupled on loop 16 with central station 10. In actual practice many more, typically 32 are on the loop. Internally, they can be a handset type of box, or a more elaborate type as disclosed in said application. Each of the boxes 20–24, is grounded by connections, 26, 28, 30 respectively. If a particular box is mounted on a metal pole which is sunk into the earth, the pole serves as a ground rod. If it is mounted on a wooden pole, then a separate ground rod and wire is required.

In normal operation the supply 12 provides a direct current throughout loop 16 to all of the boxes 20–24. When anyone wishes to signal, he can push a button or pickup a handset and his voice and/or tone signalling frequencies will be transmitted to central station 10, which will then dispatch the required emergency equipment. However, because of work being done or natural causes, the loop 16 can be broken. This clearly renders the system useless.

Figures 2, 3:
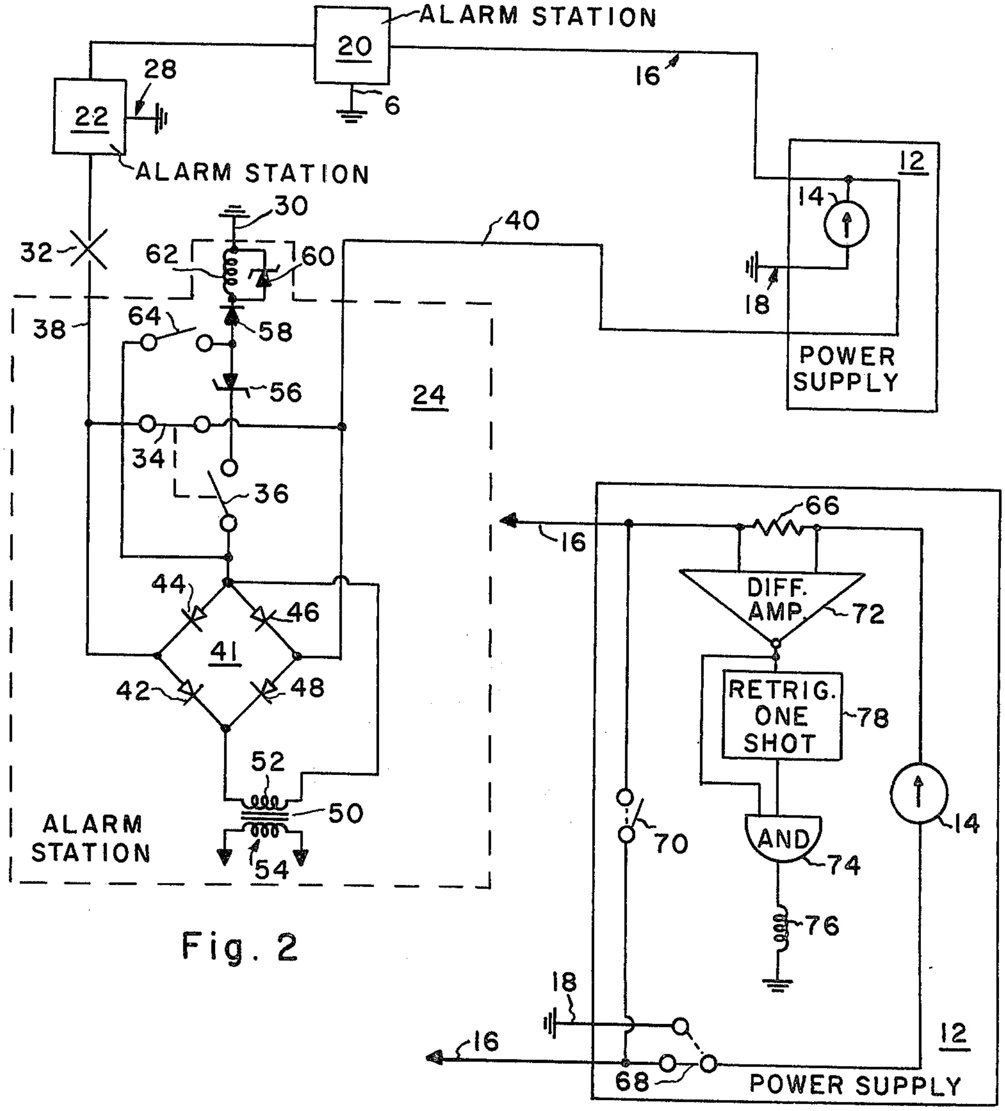
FIG. 2 is a schematic drawing of the automatic grounding system at a box.
FIG. 3 is a schematic drawing of the automatic grounding system at the central station.

FIG. 2 shows a break 32 occurring between boxes 22 and 24. In such a situation, the DC from power supply 12 through loop 16 is interrupted. By circuitry to be described below, ground 18 at supply 12 is connected to one side of source 14, while both sides of loop 16 are connected to the other side of source 14. In station 24, which is identical to the other station boxes, there is a normally closed switch 34 and a normally open switch 36 mechanically or electrically ganged to switch 34. If box 24 is not activated, then switch 34 permits the DC on loop 16 to pass through it from terminal 38 to terminal 40. When a handset (not shown) is lifted, or when a button is depressed switches 34 and 36 assume the positions opposite from that shown in FIG. 2. Then if there is no break in cable 16, current flows from terminal 38, through diode 42 of bridge 41, through primary 52 of transformer 50, through diode 46, and out terminal 40. Primary winding 52 couples the voice and tone frequencies to secondary winding 54, which in turn applies them to the remaining circuitry of box 24 (not shown). These circuits can be as described in said patent application or any other numerous circuits.

If break 32 occurs, then, a high positive voltage will be applied to terminal 40 by constant current source 14. When the handset is lifted, then switches 34 and 36 are in their alternate positions from that shown in FIG. 2. Current will flow from terminal 40, through diode 48, primary 52, switch 36, Zener diode 56, diode 58, relay coil 62 and through the ground path 30 and 18 back to source 14. It will be seen that the voltage from supply 12 must be greater than the reverse threshold voltage of diode 56 to cause reverse conduction in it, and thus complete the path. This will happen because constant current source 14 causes a voltage rise on line 40 until the reverse breakdown voltage of diode 56 is reached. It will be appreciated that diode 56 could alternately be an SCR or four layer diode. Diode 58 prevents forward conduction by Zener diode 56, which might otherwise occur due to a spurious ground and the low forward breakdown voltage of Zener diode 58 of about one volt. The spurious ground can be caused by faulty insulation, water sepage, etc.

If a break occurs between terminal 40 and supply 12, and no break 32 occurs, then terminal 38 will have the high voltage applied to it. Therefore, current will flow through diode 42, primary 52, switch 36, Zener diode 56, diode 58, relay coil 62 and ground path 30 and 18. Thus no matter where the break occurs, bridge 41 ensures that a circuit is completed between any activated alarm box and power supply 12 and well as the remaining circuits (not shown) of central station 12.

If the box 24 is of the handset type, then grounding action will remain. However, if it has a pushbutton switch 36 for sounding the alarm, then once the button is released, the grounding action will stop. To overcome this, relay coil 62, when it has current flowing through it, closed its contacts 64. This will cause current to continue to flow through coil 62, and contacts 64 maintain the ground connection even though switch 36 reverts to the open position. Thus there is a latching action. Diode 60 protects coil 62 from transients. It will be also seen that by shunting Zener diode 56 with contacts 64, the power dissipation of diode 56 is reduced. When the communication is finished, at central station 12 the current from source 14 is temporarily reduced to zero, thereby eliminating current through coil 62 and releasing the latching action. In a handset type of alarm box, relay 62 is not required.

FIG. 3 shows in more detail the power supply 12. During normal operation, when the loop 16 is unbroken, constant current source 14 supplies current to loop 16 through a low value current sensing resistor 66 and relay contact 68, which is in the position shown in FIG. 3. Since relay contact 70 is in the open position as shown therein, it will not effect the current flow through loop 16. If there is no break in loop 16 then current flows through resistor 66 and there is a voltage drop across it. This voltage difference causes the inverted output of differential amplifier 72 to be low, which in turn causes the output of AND gate 74 to be low. Hence relay coil 76, which controls contacts 68 and 70, has no current through it, and therefore contacts 68 and 70 stay in the position shown in FIG. 3.

If a break in the loop occurs, then there is no current through resistor 66, and hence no voltage across it. The inverted output of amplifier 72 is therefore high. This triggers a retriggerable one shot multivibrator 76, that normally has a high output, to provide a low output. Thus gate 74 still does not provide the current to energize coil 76. If the loop 16 stays open, then one shot 78 will eventually return to its stable state which provides a high output. This will cause gate 74 to have a high output, and since the output of amplifier 72 is high, coil 76 is energized and relay contacts 68 and 70 will assume the dotted line positions. Current generator 14 will then be grounded to ground 18 by contact 68 and provide a voltage to both sides of loop 16, the lower portion of loop 16 being supplied through contact 70.

If the break in loop 16 is a temporary one, such as will be caused by a "code wheel" type alarm box when it is signalling by interrupting the loop 16, then shortly after each break, the loop 16 will be closed. This causes the output of amplifier 72 to go into a low state, which retriggers one shot 78 to provide a low output and thus gate 74 has a low voltage output that does not energize coil 76. Clearly, one shot 78 prevents automatic grounding when the break is only of a short duration as is necessary to enable code wheel type boxes to signal.

It will be appreciated that many other embodiments are possible without departing from the spirit and scope of the invention.

We claim:

1. A method for completing a broken transmission line between first and second stations comprising sensing at said first station when said line has been broken, supplying a constant current to at least one side of said line and ground, and grounding said second station upon said supplying of said current by exceeding the threshold voltage of a solid state element, whereby said transmission line is completed through ground.

2. A method as claimed in claim 1 wherein said supplying step comprises supplying both sides of said line with said current.

3. A method as claimed in claim 1 further comprising delaying said supplying of said current for a selected time after sensing that said line has been broken.

4. A method as claimed in claim 1 wherein said sensing step comprises applying a constant current to said line and detecting when said current is interrupted.

5. A central station for operation with a transmission line and ground, said station comprising means for sensing when said line has been broken, and means coupled to said sensing means for supplying a constant current between at least a portion of said line and ground when said line has been broken to exceed the threshold voltage of a solid state element.

6. A central station as claimed in claim 5 wherein said supplying means comprises means for supplying both sides of said transmission line with said current.

7. A central station as claimed in claim 5 further comprising means coupled to said supplying means for delaying the supply of said current to said line.

8. A central station as claimed in claim 7 wherein said delaying means comprises a retriggerable monostable multivibrator having an input coupled to said sensing means and an output; an AND gate having a first input coupled to said multivibrator output, a second input coupled to said sensing means, and an output; and said supplying means comprising a relay having a coil coupled to said gate output.

9. A central station as claimed in claim 5 wherein said sensing means comprises means for constant applying a current to said transmission line and means coupled to said applying means for detecting when said current is interrupted.

10. A central station as claimed in claim 9 wherein said detecting means comprises an element means having impedance for coupling in series with said line, and a differential amplifier having a pair of inputs coupled to said element and an output coupled to said supplying means.

11. An alarm station for operation with two transmission cables and a ground, said station comprising means for supplying information signals to said cables, and solid state means having a threshold voltage coupled to said supplying means for grounding said supplying means when a constant current is applied to at least one of said cables, thereby causing the voltage at said solid state means to exceed said threshold voltage.

12. A station as claimed in claim 11 wherein said supplying means comprises a transformer.

13. A station as claimed in claim 11 wherein said grounding means comprises means for ensuring the grounding of said supplying means regardless of which of said cables has said voltage applied thereto.

14. A station as claimed in claim 13 wherein said ensuring means comprises a full wave bridge rectifier coupled to said supplying means.

15. A station as claimed in claim 11 wherein said solid state means comprises a Zener diode.

16. A station as claimed in claim 11 wherein said grounding means comprises means coupled between said supplying means and ground for latching said grounding means.

17. A station as claimed in claim 16 wherein said latching means comprises a relay.

18. A station as claimed in claim 11 wherein said solid state means comprises a silicon controlled rectifier.

* * * * *